United States Patent
Zhang et al.

(10) Patent No.: US 9,208,282 B1
(45) Date of Patent: Dec. 8, 2015

(54) ENABLING IP EXECUTION ON A SIMULATION EXECUTION PLATFORM

(71) Applicant: Cadence Design Systems, Inc., San Jose, CA (US)

(72) Inventors: David Guoqing Zhang, Fremont, CA (US); Erik S. Panu, Los Gatos, CA (US); Sandeep Suresh Pendharkar, Bangalore (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/447,439

(22) Filed: Jul. 30, 2014

(51) Int. Cl.
*G06F 11/22* (2006.01)
*G06F 17/50* (2006.01)

(52) U.S. Cl.
CPC .................................. *G06F 17/5081* (2013.01)

(58) Field of Classification Search
USPC ......................................................... 716/136
See application file for complete search history.

(56) References Cited

U.S. PATENT DOCUMENTS

| | | | |
|---|---|---|---|
| 6,077,304 A * | 6/2000 | Kasuya | 703/14 |
| 7,571,414 B2 | 8/2009 | Huang et al. | |
| 7,904,878 B2 | 3/2011 | Kolathur et al. | |
| 8,346,981 B2 | 1/2013 | Scaffidi, Jr. | |
| 2007/0174638 A1 | 7/2007 | Fan et al. | |
| 2008/0098339 A1* | 4/2008 | Chan | 716/6 |

* cited by examiner

*Primary Examiner* — Eric Lee
(74) *Attorney, Agent, or Firm* — Kenyon & Kenyon LLP

(57) ABSTRACT

In a system and method that simulates a design including a third party IP component, a driver for the IP component is compiled and executed in a workstation implementing the simulation platform for the design. The source code for the driver is modified to allow the simulation to reroute certain functions that would cause the simulator to hang until an event occurs that would unlock the simulation. The rerouting includes storing instruction location, state information, and any other context information needed to restore a paused function. The saved information is stored in a stack that is traversed upon detection of the event.

13 Claims, 7 Drawing Sheets

100

200

600

700

810

ENABLING IP EXECUTION ON A SIMULATION EXECUTION PLATFORM

BACKGROUND

Aspects of the present invention relate generally to integrated circuit designs, and in particular to techniques for simulation and test of such designs.

Hardware designers, for example integrated circuit (IC) designers, do not always design every component of a new hardware device. While designers may design one or more components of a particular device, they often employ component designs (also known as intellectual property, or IP) from one or more third-party IP providers. Using components from third-party IP providers can facilitate the design by avoiding the need for the designer to design every aspect of the device's functionality.

Hardware designers may employ a hardware based verification platform to perform certain operations on a design. Hardware verification platforms can enable testing of the various components of the design which facilitates design analysis and debugging. Multiple aspects of the hardware design typically may be tested. For example, a hardware design may undergo architectural simulation and analysis and debugging where the functionality of each of the components being implemented in the design is tested, for example, with transaction level modeling (TLM) or bus functional modeling. The hardware design may additionally undergo circuit simulation and analysis where the signals between components are tested, for example using register transition level (RTL) analysis. Other steps may include system simulation, for example to model the components of a system together, and system and software emulation, for example to model execution of software elements executing on a modeled system. Once a design is completed, one or more components of the device may be tested and verified. Such testing may require a device specific driver to verify that the inputs and outputs over a communication medium conform to a standard or predefined protocol.

A simulation platform conventionally models the hardware components at various levels of abstraction. Processor models implementing Instruction Set Simulators (ISS) in combination with hardware simulators can be used to simulate cross-compiled embedded software, for example, an operating system (OS). A collection of hardware models running such embedded software is known as a Virtual Platform (VP). When simulating a driver for design IP with a conventional VP, due to timing, programming language, and interface limitations of the driver, the modeled processors and operating systems are not practical for simulating execution of the driver. However, if the driver is executed in the workstation or other execution platform, hardware components modeled on the VP will be cut off from communication with the workstation processor and, consequently, with the driver. Timing differences may also exist between the driver running on the workstation processor or other execution platform with reference to a standard clock (wall time) and the design IP objects running on the simulator with reference to the executed simulation (simulator or design time). Due to such different and independent time domains and execution processors, cross-domain communications can cause dead-loop or hanging during the simulation, either in the driver code execution (on the workstation), or in the design IP component execution (on the simulator). Additionally, the simulation of some design IP components in this configuration may cause the simulation to hang where the simulated objects encounter a loop in the simulation. Thus additional modules and interfaces, as well as entirely new drivers, are often developed to simulate a driver and interface associated with the design IP of a device under test. However, driver development is error-prone and time consuming.

Therefore, there is a need in the art for more efficient systems and methods to simulate design IP interface drivers.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A system and method that simulates a design including a third party IP component is provided. In order to avoid the necessity of building additional interfaces that allow for the interaction of a driver with the associated IP component interface, the driver for the IP component is compiled and executed in a workstation implementing the simulation platform for the design. Additionally, for a driver compiled at the workstation, the driver will have access to the kernel/OS services at the workstation. The source code for the driver may be modified to allow the simulation to reroute certain functions that would cause the simulator to hang until an event occurs that would unlock the simulation. The modification may be signaled by the driver designer to indicate the existence of a potential hang point. A search through the source code will recognize the identified points and the appropriate modifications will be inserted to handle the rerouting of the functions. The rerouting includes storing instruction location, state information, and any other context information needed to restore a paused function. The saved information is stored in a context stack or link list that is strictly arranged in the order of detection of the event. Upon completion of the event, the stack is accessed and the paused function(s) restored in strict reverse order of detection of the event. Then execution of the simulation can continue as if the function was never paused.

The driver that is successfully tested with the simulation can be used by the IP developer to start firmware development, software verification, SOC firmware development, and firmware/driver debugging using the tested driver, even if the associated design and IP hardware is not yet available.

Figure 1:
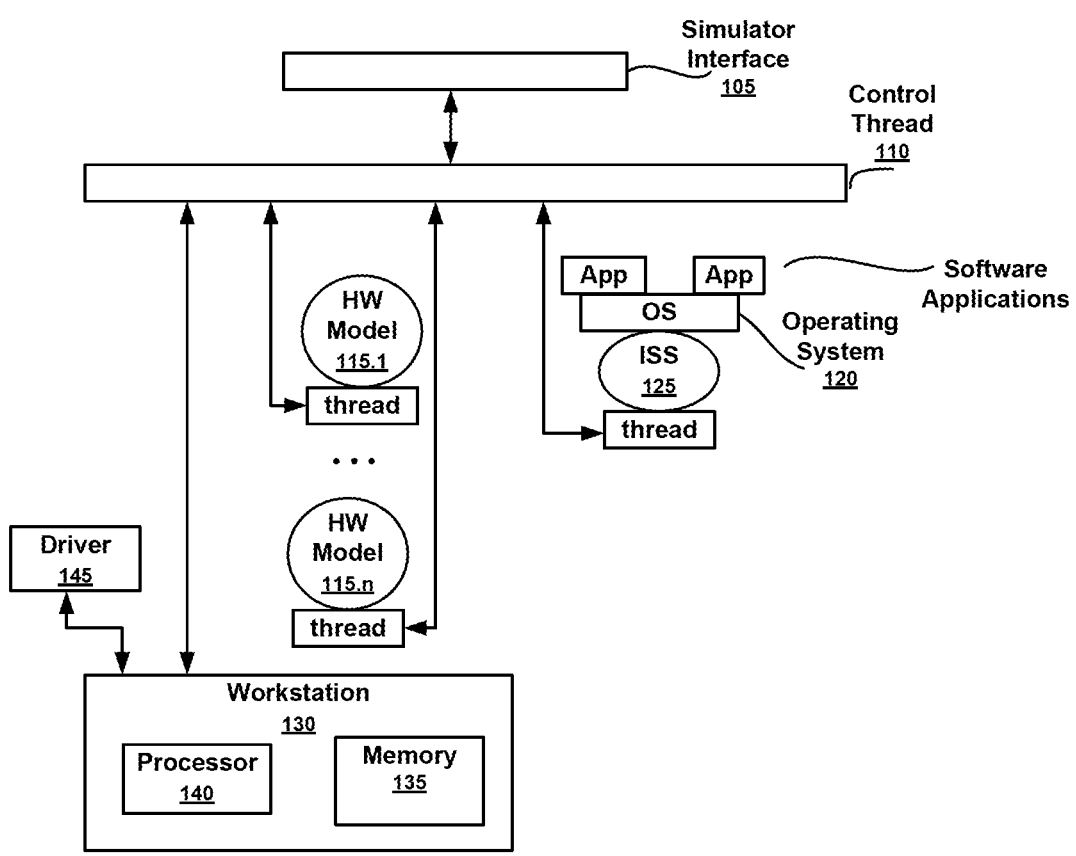
FIG. 1 illustrates an exemplary simulation platform according to an embodiment of the present invention.

FIG. 1 illustrates an exemplary simulation platform 100 according to an embodiment of the present invention. The simulation platform 100 shown in FIG. 1 is implemented to test that a design for a hardware component or system on a chip (SOC) design conforms to the standards for one or more protocols implemented within the design. The design or system under test may contain at least one IP component, herein referred to as design IP (DIP) that may be a third party IP component.

Figure 2:
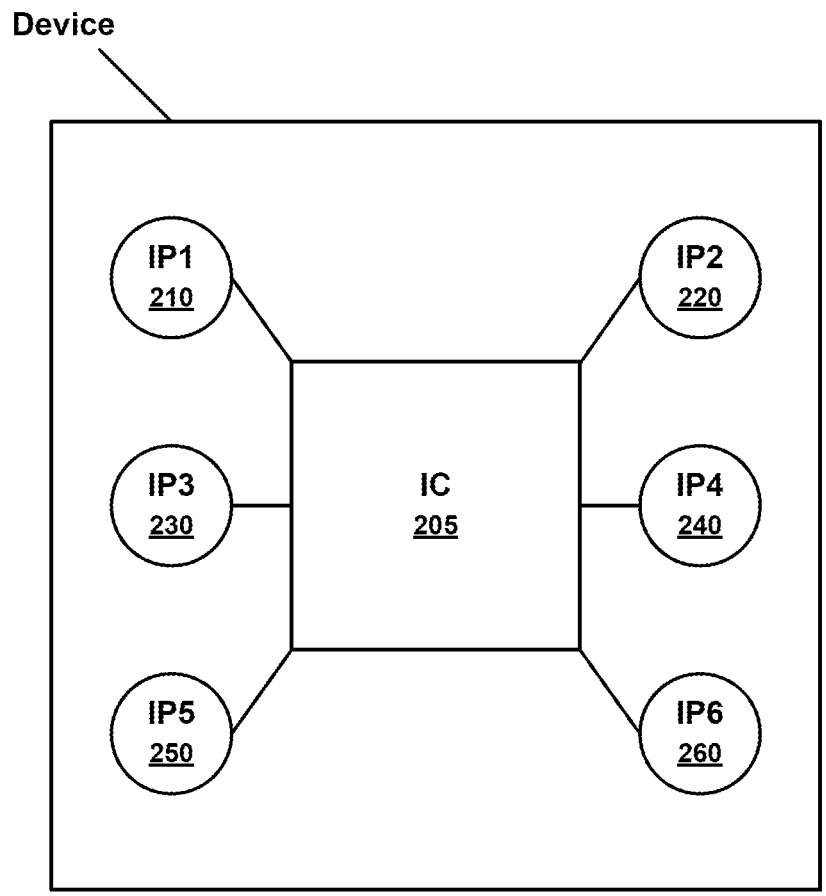
FIG. 2 is a simple block diagram illustrating an exemplary hardware design that may be tested with the verification platform according to an embodiment of the present invention.

FIG. 2 is a simple block diagram illustrating an exemplary hardware design 200 that may be tested with the simulation platform according to an embodiment of the present invention. The hardware design 200 may be a design for any hardware component or device, for example a mobile phone (including but not limited to a smartphone), a tablet, or a computer of some kind. The device includes one or more ICs 205 with IP components IP1-IP6 210-260. For example a smartphone could include multiple IP components such as memory (static or dynamic, general-purpose or special-purpose); graphics processing; audio; video; power management; various wired communication and/or bus protocols including but not limited to PCI Express, members of the PCI Express family, and/or variants thereof, in different applications depending on the data communications need; wireless communications protocols including but not limited to cellular (e.g. GSM/CDMA), Bluetooth™, Wi-Fi (some form of 802.11), WIMAX (some form of 802.16); various connection protocols including but not limited to different forms of USB (different versions, micro-USB, mini-USB, and the like), video connection protocols (e.g. Thunderbolt (which might be one example of a PCI Express application), HDMI, or others) or other connector types which may or may not be proprietary; and/or image processing (e.g. on-board camera functionality). All of these various elements could be provided in a single design (for example, in a system on a chip, or other design incorporating IP from multiple providers, or multiple types of IP from a single provider), or could be contained in multiple designs.

While some of the IP components mentioned above may be proprietary, a number of them may be developed according to a standard, be it wired or wireless communications, audio, video, memory, or others. Different IP providers can and will have different ways of implementing a particular standard. It should be noted that there may be portions of a standard for which compliance is mandatory, and other portions for which compliance is optional. The hardware designer may have a particular feature set in mind, in which compliance either with only mandatory portions of the standard, or with mandatory and certain optional portions of the standard, would be necessary.

Where a standard such as Bluetooth™, Wi-Fi, other communications, memory management, display, or other functionality in a device is implicated, verification of the design may include showing compliance with the standard. Where the functionality in question is the result of proprietary third party IP which does not necessarily follow a particular standard, the IP provider may disclose an interface definition or custom protocol, without the IP provider revealing its proprietary information. The standards or provided definitions may then be utilized by a simulation platform to show that the components of the design execute properly or to otherwise identify errors.

In the case of IP that is designed to provide particular functionality, but in accordance with a proprietary design or feature set rather than a standard, outputs of the design will be a proprietary function of the inputs. An IP provider may be able to provide a custom protocol consisting of design-based sets of inputs and corresponding outputs, making it possible to exercise the design through a selection of various combinations of inputs without revealing proprietary aspects of the IP design component. An object-oriented definition of the IP component may then be created based on the custom protocol.

Returning to FIG. 1, according to an exemplary embodiment, an IP model 115.1-115.$n$ may be provided that uses the verification and protocol knowledge developed and utilized during earlier design and verification phases of the system and device IP to execute an IP model that simulates an abstract version of the hardware IP.

The verification and protocol knowledge may include an object-oriented definition of one or more standards or other protocols implemented by the design. Objects for a protocol standard may be defined and utilized during any stage of the design verification process. For example, the object-oriented definition of the standard may be used during architectural development to confirm the component interconnections represented by associations between objects conform to the standard. Similarly, the object oriented definition of the standard may be used during component simulation, system emulation, debugging, or post-silicon analysis to confirm that the components of the design conform to the standard during execution. Additionally, the object oriented definition of the standard may be used to develop the driver and abstract IP model of the design IP to test the design before the design IP is itself ready to undergo testing. Then the driver and interface may be used to facilitate simulation of the design IP.

In FIG. 1, a simulator interface 105 may be implemented to provide control and observability for the components of the platform 100. The simulator interface 105 may be executed on a control thread 110 within an execution platform such as a computer, processor, or workstation on which the simulator is executed. The simulator interface 105 runs in a control thread 110 separate from the modeled components of the virtual platform. State information and other simulation related information for the modeled components, including verification IP and design IP objects, may then be made available via simulation commands executed by the control thread 110 when control of the simulation returns to the control thread 110.

In FIG. 1, modeled components are executed on individual simulator threads but the simulation and modeling information is all stored in a memory storage device 135 of the workstation 140.

A modeled component as described herein may refer to either a hardware component, a bare-metal software program or OS running within the context of a processor hardware component, or a process running on an OS running within the context of a processor hardware component. According to an embodiment of the present invention, the simulation platform 100 may run multiple hardware component models in sequence, with each modeled hardware component using separate host platform resources.

The simulation platform 100 may use a processor model ISS to access state information for the modeled components via an application programming interface (API). For example, function calls to the API allow the system to display the embedded software view of the memory and the registers of the modeled system. An OS 120 may be simulated with reference to an ISS 125 modeling a processor instruction set running on a modeled hardware component. Then, each software application or application process running on the OS will be executed as an OS process as necessary.

The design IP may also be modeled as a hardware model and during simulation, interface with the provided driver. As previously noted, testing an IP driver for the design IP objects modeled with the platform illustrated in FIG. 1 is not desirable. Therefore, the driver 145 will be executed at the workstation 130. However, when simulating a component that interfaces with a driver implemented on the workstation, certain functions may hang the simulator while waiting for some event to occur. To avoid the described hang-up, the source code for the driver will be modified to create a stack of context information that is saved when a potential waiting loop is encountered in the driver source code. Device and/or driver designers may insert keywords into the code to signal the beginning of a potential waiting loop. Then at each such identified point, the source code will be modified to perform additional routing as described further herein.

According to an embodiment, the waiting loop may be implemented in a function or sub-function of the driver source code. When the driver reaches source code during the execution of the function that causes the driver to wait, for example, when the source code initiates a loop until a variable written to a register equals a specific value, additional code may be added directing the driver to save the context for the current function and return. The saved context information may include at least the location of the next instruction in the function and the state information required to return the function to the same state as when the information was stored.

Figure 3:
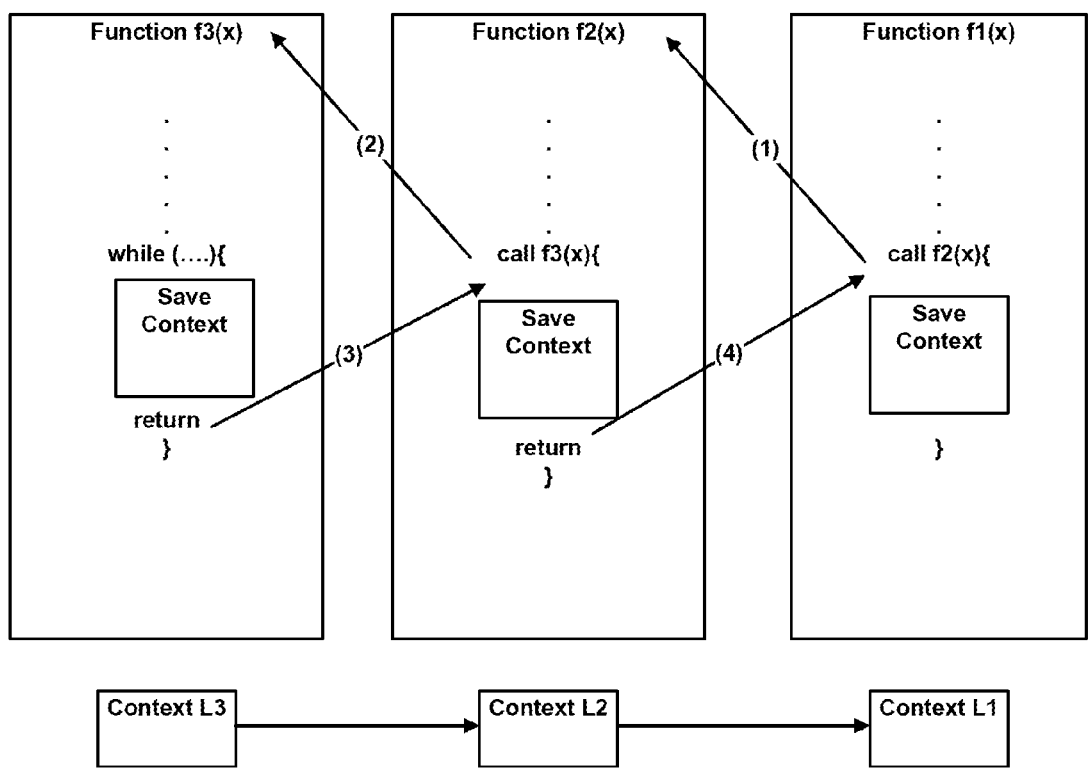
FIG. 3 illustrates an exemplary routing process according to an embodiment of the present invention.

An exemplary illustration of the routing process is described with reference to FIG. 3. As shown in FIG. 3, multiple functions may be nested in the driver source code. Preliminarily, function1 (f1($x$)) calls function2 (f2($x$)) which calls function3 (f3($x$)). Then, if function3 has a source code block that causes the driver to wait for an event, rather than waiting on the event, the context for function3 will be saved in a stack as context L3 including a pointer to the known return point for function3. Function3 will then return to function2 and if at function2, it is known that function3 was unable to complete, for example, because a context was saved for function3, then a context will also be saved for function2 as context L2 in the stack. Similarly, when function2 returns to function1 incomplete, context L1 will be saved in stack.

When an event occurs that potentially closes the waiting loop, for example, a specific value is written to a register, the stack for the driver may be traversed to find the appropriate saved context and continue execution of that function. The testbench or workstation will maintain a list of the events that would close a waiting loop and will access the appropriate stack when such an event occurs, in the order that such events are detected.

When a stack is accessed, each accessed link will restore the saved context, remove the associated link from the list, and call the next link in the reverse order that the contexts were detected and saved. For example, when the stack illustrated in FIG. 3 is accessed, the saved context L1 will be restored for function1 and the context L1 link will be removed from the list. Then function1 will call link L2, which will restore the saved context in function2 and remove the link L2 from the list. Then the context saved in L3 will be restored and the stack deleted. The functionality to execute this restoring and routing is inserted into the source code as part of the previously described modification. When the context in L3 is restored, function3 will continue as if it were never stopped. At this point, because the event that triggered the stack was the event that will close the waiting loop in function3, function3 will execute to completion and return to function2 as normal.

Figure 4:
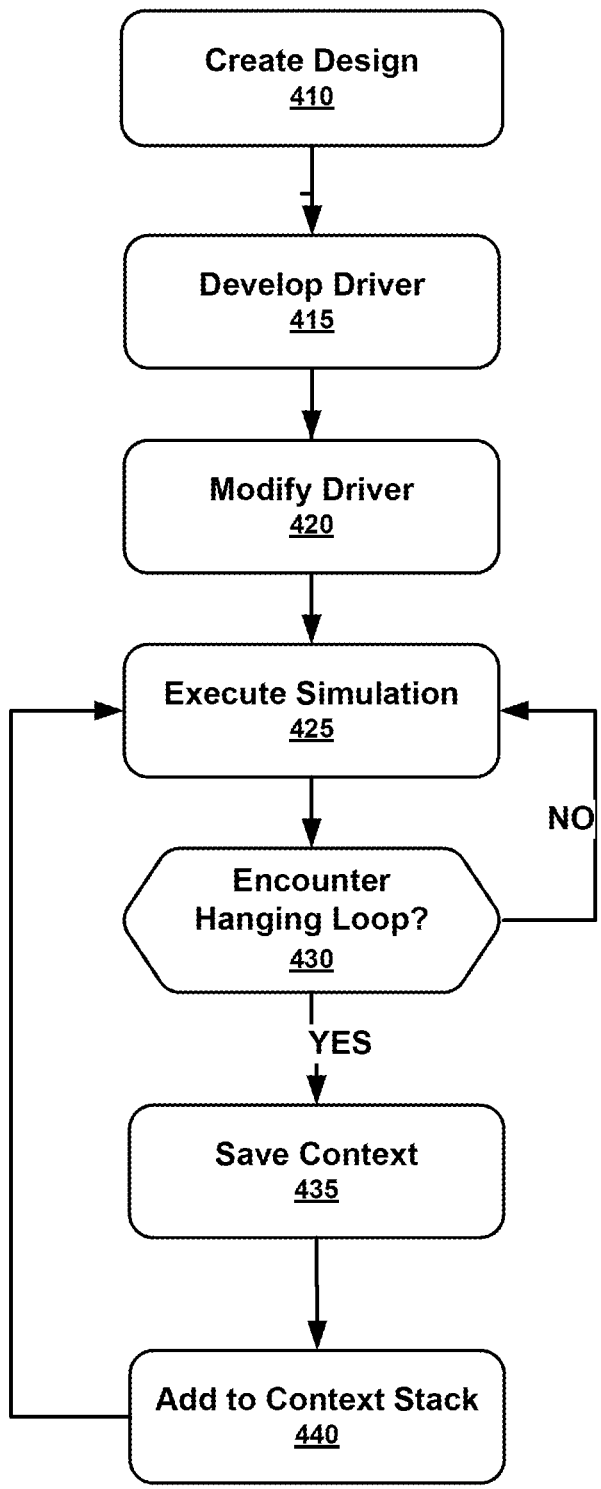
FIG. 4 illustrates an exemplary method for adjusting a simulation driver to test a hardware design according to an embodiment of the present invention.

FIG. 4 illustrates an exemplary method for adjusting a simulation driver to test a hardware design according to an embodiment of the present invention. In FIG. 4, a hardware device containing design IP is designed (block 410). Then a driver is developed to implement the design and the protocols being utilized by the design IP (block 415). The driver is then modified to facilitate operation on a workstation as described herein (block 420). The driver source code will be modified to avoid any potentially hanging loops that may occur due to the differences in the workstation and simulation environments. Then, the simulation of the hardware design will be executed (block 425). If an adjustment for a hanging loop is encountered (block 430), the context of the current function will be saved such that the function can return where it was paused (block 435) and a stack will be created pointing to the return location of the function (block 440). Then execution of the simulation will continue until complete (block 425).

Figure 5:
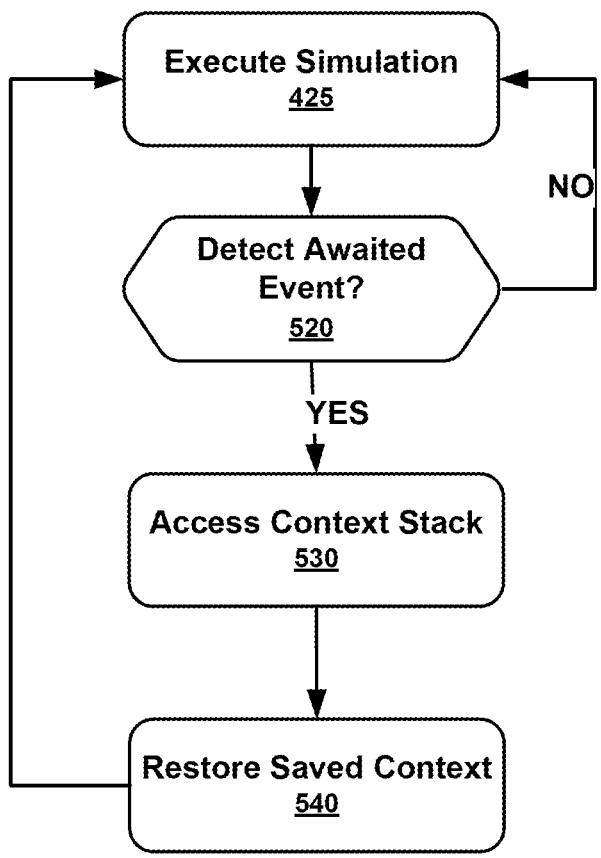
FIG. 5 illustrates an exemplary method for restoring a paused function in a simulation driver according to an embodiment of the present invention.

An exemplary process to complete the verification of the design and associated driver is shown in FIG. 5. During execution of a simulation for a hardware design containing design IP (block 425), the process may encounter either a hanging loop as in FIG. 4 (block 430) or an awaited event that would close a hanging loop as in FIG. 5 (block 520). If an awaited event is detected (block 520), the workstation executing the simulation will access a stored stack associated with the event (block 530). Then the stored contexts in the stack will be restored (block 540) until a hanging loop that is closed by the detected event is restored. Then the simulation will continue executing as if it was never paused (block 510).

Figure 6:
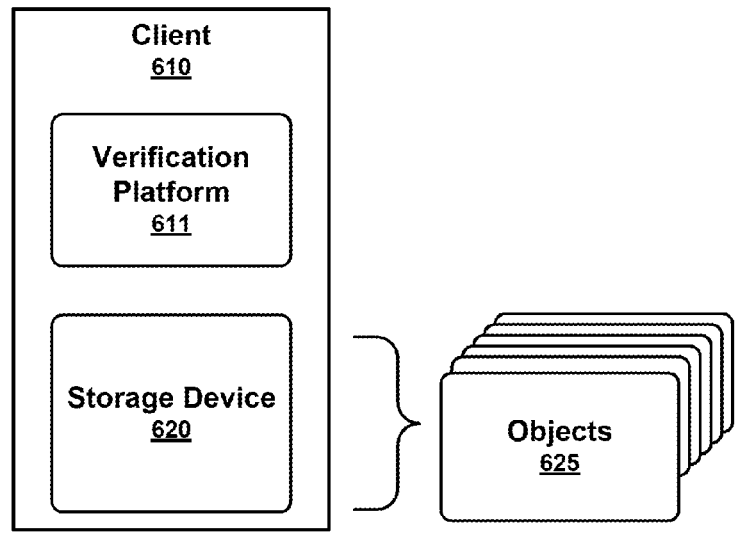
FIG. 6 is a simple block diagram illustrating components of an exemplary system according to an embodiment of the present invention.

A user may access a simulation or emulation platform in a standalone client system, client-server environment, or a networked environment. FIG. 6 is a simple block diagram illustrating components of an exemplary system 600 according to an embodiment of the present invention. As shown in FIG. 6, a system 600 may comprise a workstation or client 610 executing a simulation platform 611 and having a memory storage 620. The client 610 may be any computing system that executes a simulation platform 611 or otherwise facilitates access to memory storage 620, for example a personal computer. The client 610 may include a processor that performs a method in accordance with the disclosed embodiments. Such a client would be part of an overall simulation system in accordance with the disclosed embodiments.

Hardware designs, instruction sets, software packages, instances of modeled components, interface definitions, and other objects 625 used by the simulation platform 611 may be stored in memory storage 620. A user may access the objects 625 stored in memory storage 620 with the client 610 via the simulation platform 611, where the simulation platform 611 is capable of accessing memory storage 620 and displaying the objects 625 and the data associated with the simulation. The simulation platform 611 may include a user interface, for example a program, application or middleware that acts as a frontend to and facilitates access to objects in memory storage 620. The simulation platform 611 may facilitate verification of the components in a hardware design using the display and edit tools and procedures described herein. The user may interact with the simulation platform 611 through a number of input devices, such as by inputting a selection as with a mouse or inputting a request as with a keyboard. The user may observe the simulation results on an output device or display. The simulation platform 611 may run in an application window controlled by the user.

Memory storage may include a file system, hard drive, database, or any other method of storing data. According to an embodiment, multiple memory storage devices may be implemented (not shown). For example, design storage may contain the hardware design and related information and a separate simulation database may contain interface definitions and other objects used to run simulation tests on a hardware design.

As shown in FIG. 6, a client 610 may be a stand-alone system, as may be of particular interest where the design being simulated is confidential. Additionally, according to an aspect of an embodiment as shown in FIG. 7, a client 710 may be part of a networked environment.

Figure 7:
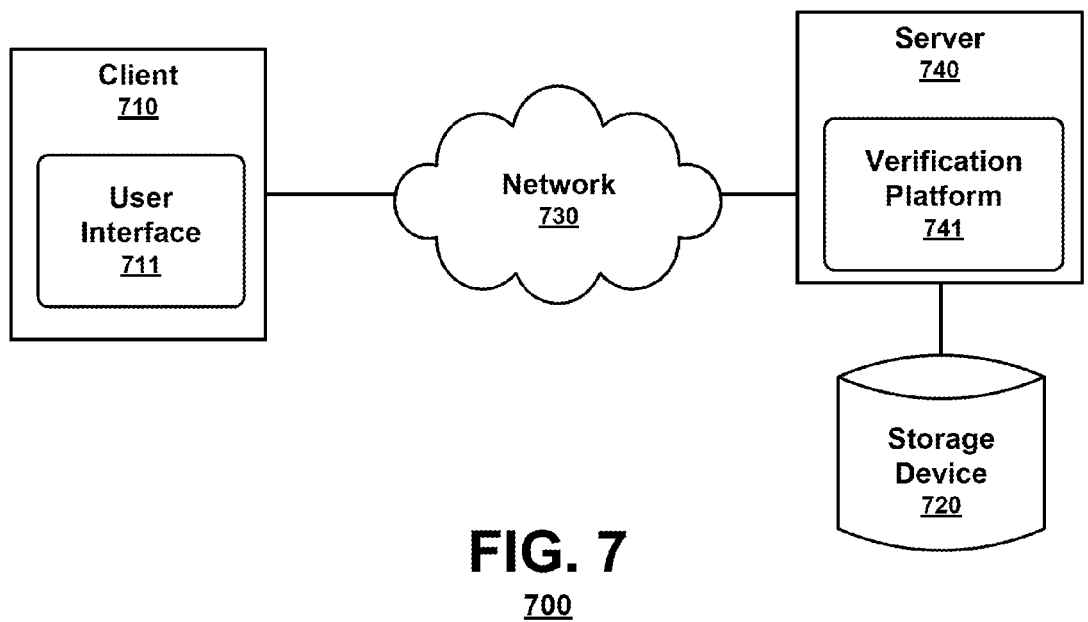
FIG. 7 is a simple block diagram illustrating components of an exemplary system according to an embodiment of the present invention.

FIG. 7 is a simple block diagram illustrating components of an exemplary system 700 according to an embodiment of the present invention. As shown in FIG. 7, system 700 may include a client 710 having a user interface 711. The client 710 may be connected to a server 740 via a network 730. The simulation platform 741, which in this embodiment is located at server 740, may have access to storage device 720 storing hardware designs, instruction sets, software packages, instances of modeled components, interface definitions, and other objects utilized by the simulation platform 741. The server 740 may include a processor that performs a method in accordance with the disclosed embodiments. Such a server then would be part of an overall simulation system in accordance with the disclosed embodiments.

A user may access a simulation platform 741 at the server 740 via the client 710 having a user interface 711 capable of accessing and displaying the components implemented as part of a hardware design and the results of the simulation of those components. The client 710 may be any computing system that facilitates the user accessing storage device 720, for example a personal computer. The network 730 may be a wired or wireless network that may include a local area network (LAN), a wireless area network (WAN), the Internet, or any other network available for accessing storage device 720 from the client 710.

The server 740 may be a network server accessible to the client 710 via the network 730 that may manage access to storage device 720. The user interface 711 may receive instructions regarding simulation of a design from the user and utilizing the objects stored in memory storage 720, facilitate a display of the simulation or the information gathered during the simulation. Multiple different clients (not shown) may access storage device 720 via the network 730 and request access to the objects stored therein.

In another networked environment, the simulation platform may be executed on a network capable client and access the designs, packages and other objects stored in one or more storage devices via a network and communications server.

Figure 8:
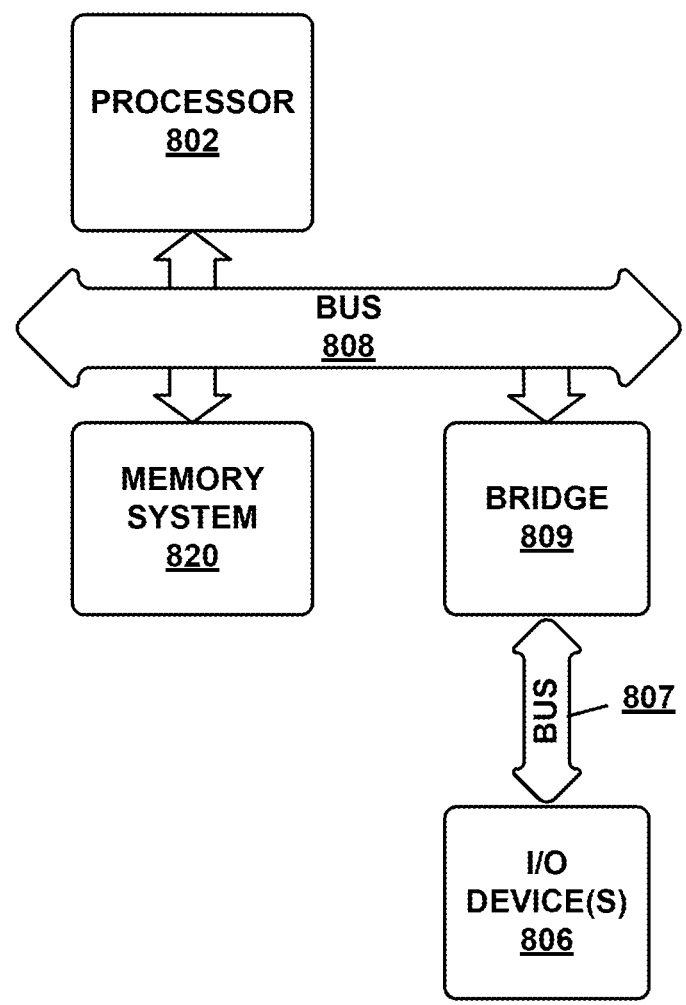
FIG. 8 is a simple block diagram illustrating components of an exemplary client according to an embodiment of the present invention.

FIG. 8 is a simple block diagram illustrating components of an exemplary client 810 according to an embodiment of the present invention. As shown in FIG. 8, the client 810 configured to execute the simulation platform as described herein may include a processor 802, a memory system 820 and one or more input/output (I/O) devices 806 in communication. The communication can be implemented in a variety of ways and may include one or more computer buses 807, 808 and/or bridge devices 809 as shown in FIG. 8. According to an aspect of an embodiment, the I/O devices 806 can include network adapters and/or mass storage devices from which the client 810 can receive commands for executing the phases of verification.

As shown in FIG. 6, a client 810 may be a stand-alone system, as may be of particular interest where the components being simulated are confidential. Additionally, according to an aspect of an embodiment as shown in FIG. 7, a client 810 may be part of a networked environment.

Although primarily described with reference to a driver, the described embodiments may be utilized with any software stack, including firmware, developed to operate with an IP component. Any driver or software stack used during the simulation of a hardware design containing design IP may be used in the verification and simulation procedures described herein.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided as separate units. Additionally, it is noted that the arrangement of the blocks in FIGS. 4-5 does not necessarily imply a particular order or sequence of events, nor are they intended to exclude other possibilities. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A computer-implemented method of simulating a hardware design that includes a third party IP component and a driver for the component, the method comprising:
   identifying, with a processor, a function in source code for the driver that includes a waiting loop that would cause simulation of the design to hang;
   modifying, with a processor, the identified function of the source code, the modifying requiring the processor to save the location and state information of the function during execution of the simulation of the driver and exit the function until an event occurs that would close the waiting loop; and
   when the event occurs during the simulation, accessing saved location and state information and resuming the function;
   executing the simulation of the design;
   wherein said simulation facilitates the manufacture of an integrated circuit incorporating the hardware design.

2. The method of claim 1, wherein if the function is nested in another function, saving the location and state information for each function in a stack.

3. The method of claim 1, wherein said identifying and modifying are performed statically, prior to simulation of the design.

4. The method of claim 1, wherein said identifying and modifying are performed dynamically, during the simulation of the design.

5. A computer-implemented method of simulating a hardware design including a driver for a third party IP component that is part of the design, the method comprising:
- identifying, with a processor, a function in source code for the driver that includes a waiting loop that would cause simulation to hang;
- modifying the identified function to cause the driver to save the location and state information of the function and to exit the function until an event occurs that would close the waiting loop;
- simulating the hardware design;
- upon encountering a modified function in the driver:
  - saving the location and state information of the function;
  - exiting the function; and
  - continuing the simulation;
- when an event occurs during the simulation that would close the waiting loop, accessing saved location and state information and resuming the function;
- wherein said simulation facilitates the manufacture of an integrated circuit incorporating the hardware design.

6. The method of claim 5, further comprising, if the function is nested in another function, saving the location and state information for each function in a stack.

7. The method of claim 5, wherein the driver is developed for an interface of a model of the third party IP component, the model incorporating verification knowledge developed during design and verification phases of the hardware design.

8. A non-transitory computer readable medium storing instructions that when executed by a processor perform a method of simulating a hardware design including a driver for a third party IP component that is part of the design, the method comprising:
- identifying, with a processor, a function in source code for the driver that includes a waiting loop that would cause the simulation to hang;
- modifying the identified function to cause the driver to save the location and state information of the function and to exit the function until an event occurs that would close the waiting loop;
- simulating the hardware design;
- during simulation, upon encountering a modified function in the driver:
  - saving the location and state information of the function;
  - exiting the function; and
  - continuing the simulation;
- upon detecting the occurrence of an event that would close a waiting loop, accessing the saved location and state information and resuming the function;
- wherein said simulation facilitates the manufacture of an integrated circuit incorporating the hardware design.

9. The non-transitory computer readable medium of claim 8, wherein the method further comprises: if the function is nested in another function, saving the location and state information for each function in a link list.

10. The non-transitory computer readable medium of claim 8, wherein the driver is developed for an interface of a model of the third party IP component, the model incorporating verification knowledge developed during design and verification phases of the hardware design.

11. A system comprising:
- a memory to store an integrated circuit design including a driver for a third party IP component that is part of the design; and
- a processor configured to test the design by:
  - identifying a function in source code for the driver that includes a waiting loop that would cause simulation to hang;
  - modifying the identified function to cause the driver to save the location and state information of the function and to exit the function until an event occurs that would close the waiting loop;
  - simulating the hardware design;
  - upon encountering a modified function in the driver:
    - saving the location and state information of the function;
    - exiting the function; and
    - continuing the simulation;
  - upon detecting the occurrence of an event that would close a waiting loop, accessing the saved location and state information and restoring the function;
  - wherein said simulation facilitates the manufacture of an integrated circuit incorporating the hardware design.

12. The system of claim 11, wherein the processor is further configured to save the location and state information for a plurality of functions in a stack if the encountered function is nested in another function.

13. The system of claim 11, wherein the driver is developed for an interface of a model of the third party IP component, the model incorporating verification knowledge developed during design and verification phases of the hardware design.

* * * * *